US008654294B2

United States Patent
Cho et al.

(10) Patent No.: US 8,654,294 B2
(45) Date of Patent: Feb. 18, 2014

(54) LIQUID CRYSTAL DISPLAY AND MANUFACTURING METHOD THEREOF

(75) Inventors: Seon-Ah Cho, Busan (KR); Hyun-Wuk Kim, Asan-si (KR); Eun-Je Jang, Asan-si (KR); You-Sik Shin, Asan-si (KR)

(73) Assignee: Samsung Display Co., Ltd., Yongin (KR)

( * ) Notice: Subject to any disclaimer, the term of this patent is extended or adjusted under 35 U.S.C. 154(b) by 301 days.

(21) Appl. No.: 13/070,739

(22) Filed: Mar. 24, 2011

(65) Prior Publication Data

US 2012/0013815 A1    Jan. 19, 2012

(30) Foreign Application Priority Data

Jul. 16, 2010   (KR) .................. 10-2010-0069202

(51) Int. Cl.
*G02F 1/1343*   (2006.01)
*G02F 1/136*    (2006.01)

(52) U.S. Cl.
USPC ................. 349/141; 349/42; 349/43

(58) Field of Classification Search
USPC ............................ 349/42, 43, 141
See application file for complete search history.

(56) References Cited

U.S. PATENT DOCUMENTS

| | | | |
|---|---|---|---|
| 7,564,529 B2 * | 7/2009 | Ahn ........................ | 349/141 |
| 8,130,352 B2 * | 3/2012 | Jin ........................... | 349/141 |
| 2006/0146255 A1 * | 7/2006 | Ahn ........................ | 349/141 |
| 2007/0035675 A1 | 2/2007 | Um et al. | |
| 2012/0013815 A1 * | 1/2012 | Cho et al. .............. | 349/33 |

FOREIGN PATENT DOCUMENTS

| | | |
|---|---|---|
| JP | 2007-047797 | 2/2007 |
| KR | 10-2006-0123996 | 12/2006 |
| KR | 10-2006-0123997 | 12/2006 |
| KR | 10-2007-0014283 | 2/2007 |
| KR | 10-2007-0052173 | 5/2007 |
| KR | 10-2007-0082756 | 8/2007 |
| KR | 10-2008-0028130 | 3/2008 |
| KR | 10-2008-0051366 | 6/2008 |
| KR | 10-2008-0094646 | 10/2008 |
| KR | 10-2009-0010528 | 1/2009 |
| KR | 10-2009-0020772 | 2/2009 |

* cited by examiner

*Primary Examiner* — Rhonda Peace

(74) *Attorney, Agent, or Firm* — H.C. Park & Associates, PLC

(57) ABSTRACT

A liquid crystal display includes an insulation substrate; a gate line, a gate electrode, and a reference voltage line positioned on the insulation substrate; a reference electrode contacting the reference voltage line; a gate insulating layer disposed on the gate line and the reference electrode; a semiconductor disposed on the gate insulating layer and positioned on the gate electrode; a data line and a drain electrode disposed on the semiconductor; a passivation layer disposed on the data line and the drain electrode; and a pixel electrode connected to the drain electrode and overlapping the reference electrode.

36 Claims, 13 Drawing Sheets

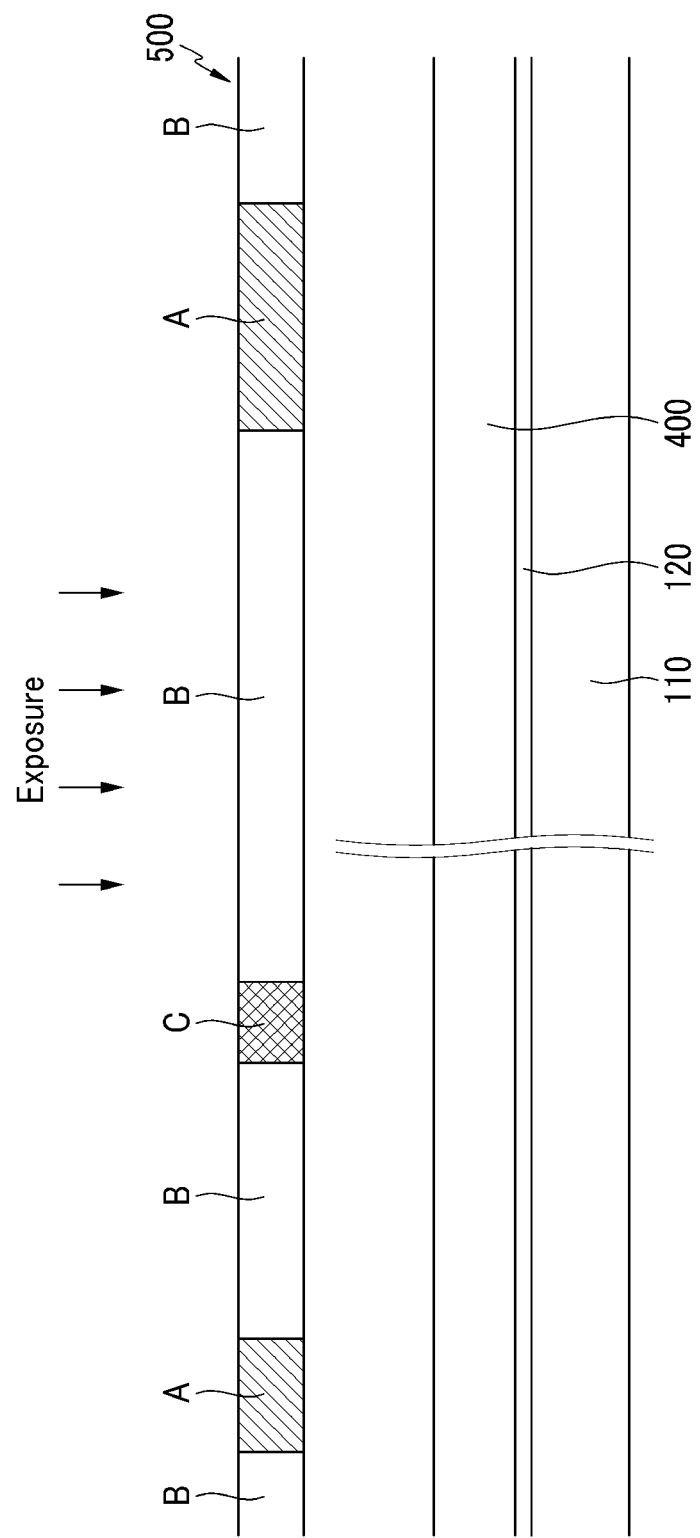

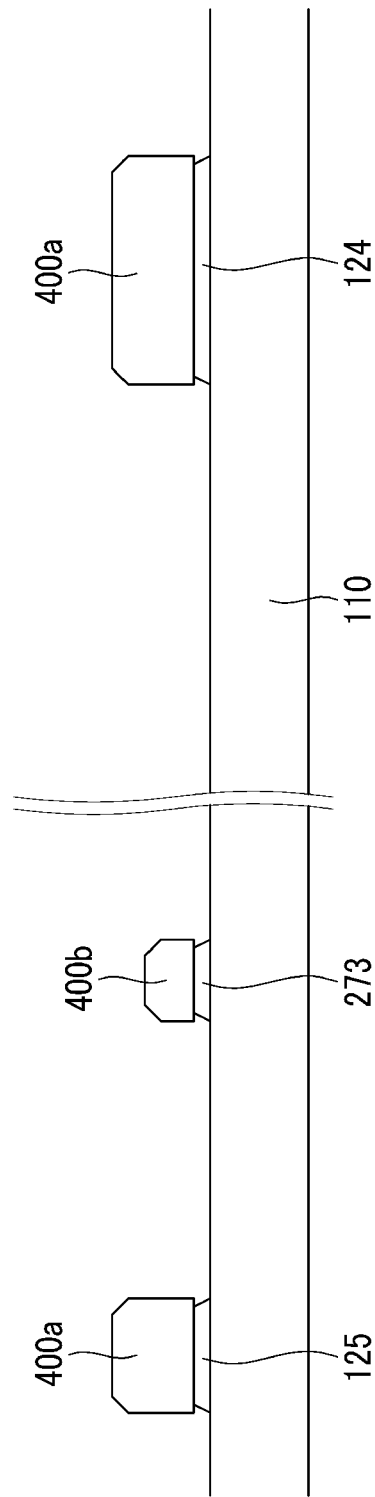

LIQUID CRYSTAL DISPLAY AND MANUFACTURING METHOD THEREOF

CROSS REFERENCE TO RELATED APPLICATION

This application claims priority from and the benefit of Korean Patent Application No. 10-2010-0069202, filed on Jul. 16, 2010, which is hereby incorporated by reference for all purposes as if fully set forth herein.

BACKGROUND OF THE INVENTION

1. Field of the Invention

Exemplary embodiments of the present invention relate to a liquid crystal display and a manufacturing method of a liquid crystal display.

2. Discussion of the Background

Liquid crystal displays (LCDs) are one of the most widely used flat panel displays. An LCD displays images by applying voltages to field-generating electrodes that generate an electric field in a liquid crystal (LC) layer. The potential energy established by the interaction of liquid crystal molecules in the LC layer with the electric field determines the molecular orientations, and the polarization of incident light is adjusted as the incident light propagates through the oriented liquid crystal molecules.

LCDs may be light weight, thin, and may be easily produced; however, LCDs may have lower lateral visibility than front visibility. Numerous liquid crystal arrangements and driving methods have been developed to reduce this disparate effect. To realize a wide viewing angle, a liquid crystal display may have a pixel electrode and a reference electrode on the same substrate.

However, in the process of forming the pixel electrode and the reference electrode of the liquid crystal display, separate photomasks may be required to form the two electrodes, and additional formation of a contact hole may be required to accommodate contact between a reference voltage line that provides a reference potential and the reference electrode.

The information in this section is for understanding of the background of the invention and may contain information that does not form the prior art.

SUMMARY OF THE INVENTION

Exemplary embodiments of the present invention provide a liquid crystal display and a manufacturing method thereof that may have a pixel electrode and a reference electrode on the same substrate without a complicated manufacturing process.

Exemplary embodiments of the present invention also provide a liquid crystal display having a reference voltage line, a reference electrode, a gate line, and a gate electrode formed using one mask such that the manufacturing process may be simplified and the manufacturing cost may be reduced.

Additional features of the invention will be set forth in the description which follows and, in part, will be apparent from the description or may be learned by practice of the invention.

An exemplary embodiment of the present invention discloses a liquid crystal display that comprises a first substrate; a gate line, a gate electrode, and a reference voltage line each disposed on the first substrate; a reference electrode disposed on the first substrate and contacting the reference voltage line; a gate insulating layer disposed on the gate line, the gate electrode, and the reference electrode; a semiconductor disposed on the gate insulating layer and the gate electrode; a data line and a drain electrode disposed on the semiconductor; a passivation layer disposed on the data line and the drain electrode; and a pixel electrode connected to the drain electrode and overlapping the reference electrode.

An exemplary embodiment of the present invention also discloses a method for manufacturing a liquid crystal display. The method comprises forming a gate line, a gate electrode, a reference voltage line, and a reference electrode on a substrate using one photolithography step; forming a gate insulating layer on the substrate, the gate line, the gate electrode, the reference voltage line, and the reference electrode; forming a semiconductor, a data line, and a drain electrode on the gate insulating layer; forming a passivation layer on the semiconductor, the data line, and the drain electrode; and forming a pixel electrode on the passivation layer.

An exemplary embodiment of the present invention additionally discloses a liquid crystal display that comprises a first panel comprising a substrate; a second panel facing the first panel; a liquid crystal layer disposed between the first panel and the second panel and comprising liquid crystal molecules; a gate electrode and a reference voltage line both disposed on the substrate; a reference electrode disposed on the substrate and contacting the reference voltage line; a drain electrode disposed on the substrate and partially overlapping the gate electrode; and a pixel electrode connected to the drain electrode and overlapping the reference electrode. The reference voltage is configured to receive a first voltage from the reference voltage line, the pixel electrode is configured to receive a second voltage, and the liquid crystal molecules are oriented based on the difference between the first voltage and the second voltage.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

FIG. 4, FIG. 5A, FIG. 5B, FIG. 5C, FIG. 5D, FIG. 5E, FIG. 7, and FIG. 9 are cross-sectional views showing parts according to a manufacturing method of a liquid crystal display according to an exemplary embodiment of the present invention.

DETAILED DESCRIPTION OF THE ILLUSTRATED EMBODIMENTS

Figure 1:
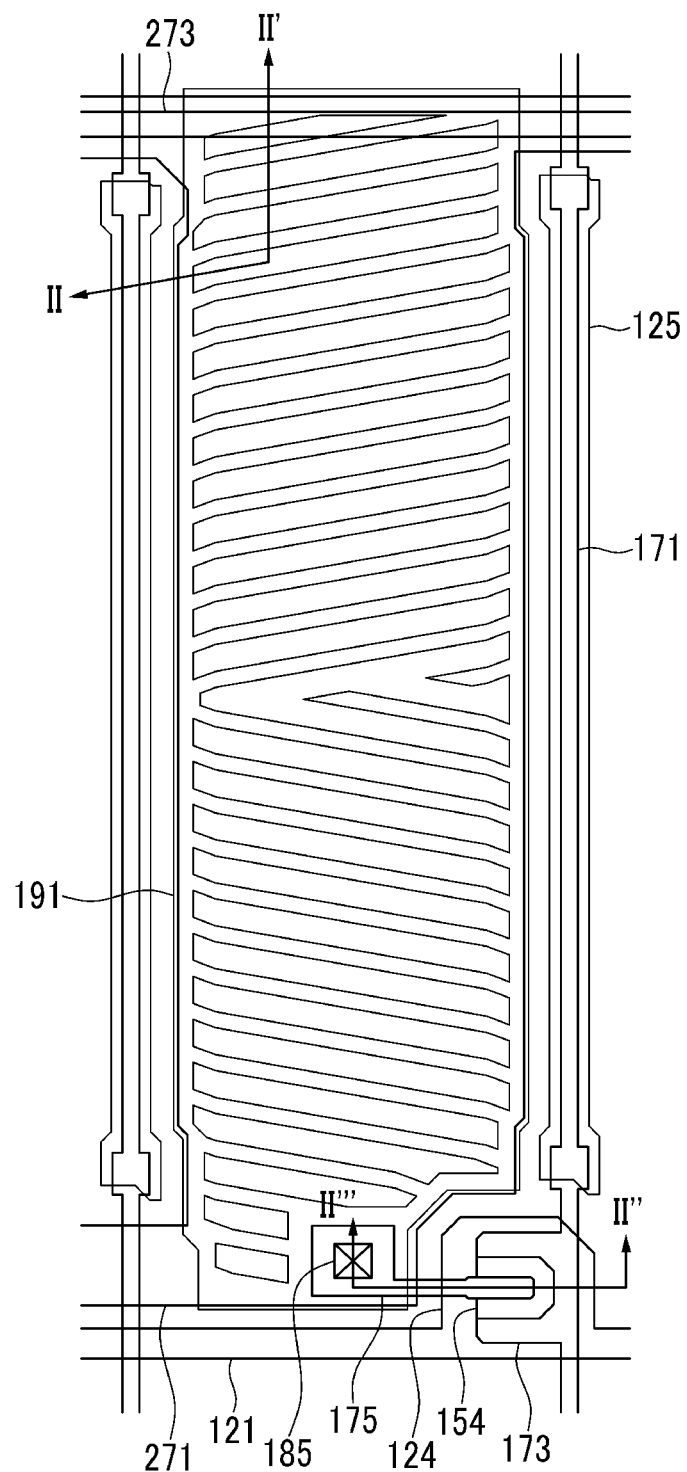
FIG. 1 is a layout view of a liquid crystal display according to an exemplary embodiment of the present invention.

The invention is described more fully hereinafter with reference to the accompanying drawings in which embodiments of the invention are shown. This invention may, however, be embodied in many different forms and should not be construed as limited to the embodiments set forth herein. Rather, these embodiments are provided so that this disclosure is thorough and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on," "connected to," or "coupled to" another element or layer, it can be directly on, directly connected to, directly coupled to the other element or layer, or intervening elements or layers may be present. In contrast, when an element is referred to as being "directly on," "directly connected to," or "directly coupled to" another element or layer, there are no intervening elements or layers present.

First, a liquid crystal display according to an exemplary embodiment of the present invention is described with reference to drawings.

Figure 2:
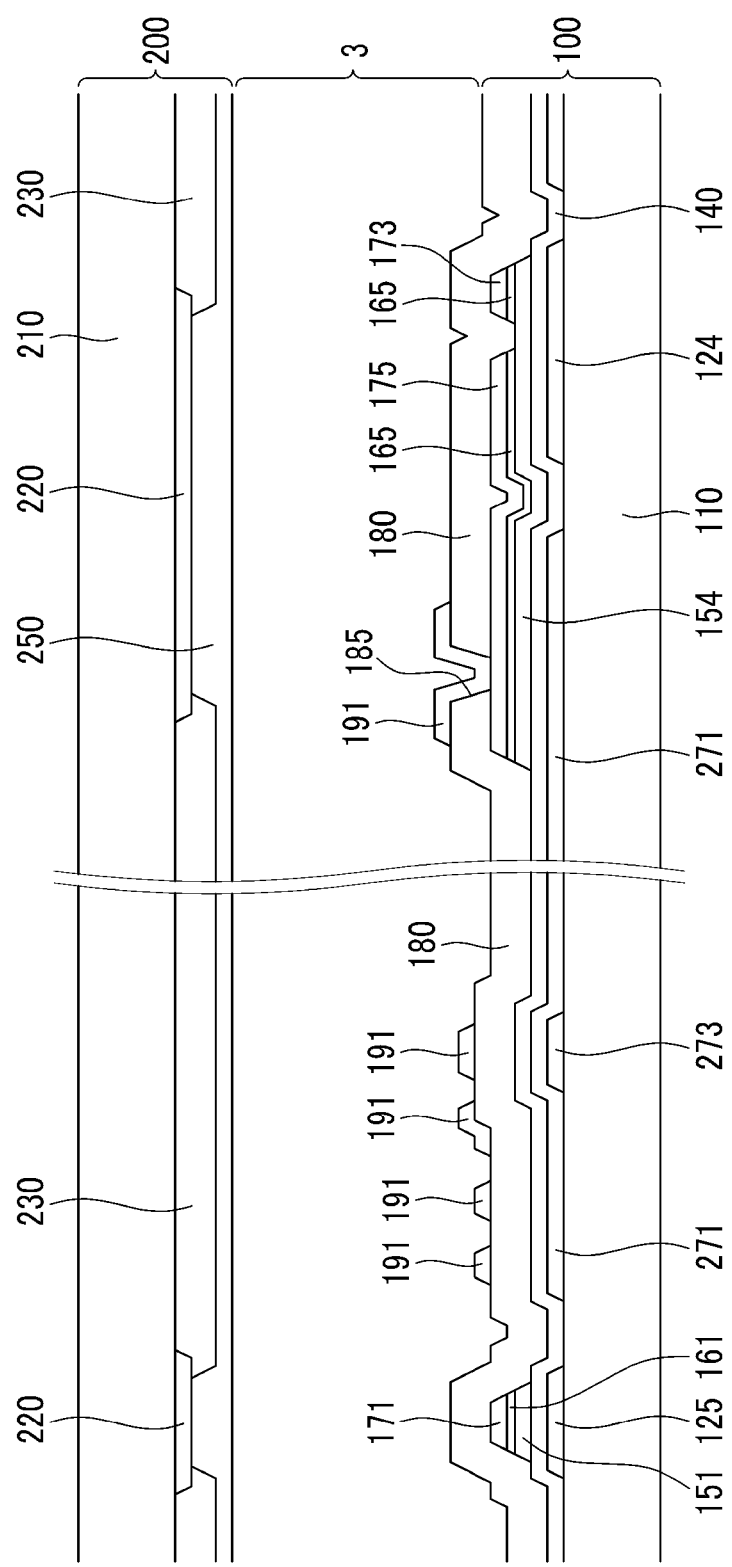
FIG. 2 is a cross-sectional view of the liquid crystal display shown in FIG. 1 taken along discontinuous line II-II'-II".

FIG. 1 is a layout view of a liquid crystal display according to an exemplary embodiment of the present invention, and FIG. 2 is a cross-sectional view of the liquid crystal display shown in FIG. 1 taken along discontinuous line II-II'-II".

Referring to FIG. 1 and FIG. 2, a liquid crystal display according to an exemplary embodiment of the present invention includes a lower panel 100 facing an upper panel 200 and a liquid crystal layer 3 interposed therebetween.

The lower panel 100 is described first.

A gate conductor including a gate line 121, a reference voltage line 273, and a dummy line 125 is formed on an insulation substrate 110 that may be made of transparent glass or plastic.

The gate line 121 includes a gate electrode 124 and an end (not shown) having a wide area for connection with other layers or a driving circuit.

The reference voltage line 273 is directly connected to a reference electrode 271, which will be described later, to transmit a reference voltage to the reference electrode 271. The reference voltage line 273 may be parallel to the gate line 121 and may be made of the same material as the gate line 121.

The dummy line 125, which is electrically floated, is disposed under a semiconductor 151 and a data line 171 to be described later.

The reference electrode 271 is formed on the insulation substrate 110. The reference electrode 271 is mainly disposed on the region that the gate conductor (121, 273, and 125) does not occupy, and the reference electrode 271 covers the reference voltage line 273 of the gate conductor (121, 273, and 125) such that it is directly electrically and physically connected to the reference voltage line 273. The reference electrode 271 may be made of a conductive material such as poly-crystalline, mono-crystalline, or amorphous indium tin oxide (ITO) and indium zinc oxide (IZO).

A gate insulating layer 140, which may be made of silicon nitride (SiNx) or silicon oxide (SiOx), is formed on the gate conductor (121, 273, and 125) and the reference electrode 271. The gate insulating layer 140 may have a multilayer structure including at least two insulating layers having different physical properties.

A plurality of semiconductor stripes 151 may be made of hydrogenated amorphous silicon (a-Si) or polysilicon and is formed on the gate insulating layer 140. The semiconductor stripes 151 mainly extend in a longitudinal direction and include a plurality of projections 154 protruding toward the gate electrode 124.

A plurality of ohmic contact stripes, projections, and islands 161, 163, and 165 are formed on the semiconductor stripes 151. The ohmic contacts 163 and 165 may be made of a material such as n+ hydrogenated amorphous silicon that may contain an n-type impurity such as phosphorus doped in high concentration or a silicide. The ohmic contact stripes 161 have a plurality of projections 163, and the projections 163 and the ohmic contact islands 165 are formed in pairs on the projections 154 of the semiconductor stripes 151.

A plurality of data lines 171 and a plurality of drain electrodes 175 are formed on the ohmic contacts 161 and 165 and the gate insulating layer 140.

The data line 171 transmits the data signal and mainly extends in the longitudinal direction thereby intersecting the gate line 121 and the reference voltage line 273.

Each data line 171 includes a plurality of source electrodes 173 that extend toward the gate electrode 124 and a wide end (not shown) for connecting to other layers or an external driving circuit.

The data line 171 adjacent to the gate line 121 and the reference voltage line 273 is expanded, thereby preventing disconnection thereof.

The drain electrode 175 is separated from the data line 171 and faces the source electrode 173 with respect to the gate electrode 124.

The drain electrode 175 includes a bar-shaped end and an extension at the other end having a wide area. The bar-shaped end is partially enclosed by the source electrode 173.

The gate electrode 124, the source electrode 173, and the drain electrode 175 form a thin film transistor (TFT) along with the projections 154 of the semiconductor 151, and a channel of the thin film transistor is formed in the semiconductor 154 between the source electrode 173 and the drain electrode 175.

A passivation layer 180 is formed on the gate insulating layer 140, the data conductor (171, 173, and 175), and the exposed semiconductor 154. The passivation layer 180 may have a dual-layered structure.

The passivation layer 180 has a plurality of contact holes 185 exposing a portion of the drain electrode 175, and the passivation layer 180 and the gate insulating layer 140 have contact holes (not shown) exposing the end of the gate line 121.

A pixel electrode 191 is formed on the passivation layer 180.

The pixel electrode 191 overlaps the reference electrode 271 and includes a plurality of branch electrodes and a longitudinal connection and transverse connection connecting a plurality of branch electrodes. The pixel electrode 191 may be made of a transparent conductive material such as poly-crystalline, mono-crystalline, or amorphous indium tin oxide (ITO) and indium zinc oxide (IZO).

The transverse connection of the pixel electrode 191 is almost parallel to the gate line 121 and the reference voltage line 273 and connects the branch electrodes to each other in horizontal directions. The longitudinal connection of the pixel electrode 191 extends in the same direction as the data line 171, thereby connecting the branch electrodes in vertical directions.

The pixel electrode 191 is physically and electrically connected to the drain electrode 175 through the contact hole 185 of the passivation layer 180.

Although not shown, an alignment layer may be formed on the pixel electrode 191 and the passivation layer 180, and the alignment layer may be a horizontal alignment layer and may be rubbed in a rubbing direction. The rubbing direction of the alignment layer may form an angle of about 7° along with the direction that the branch electrode of the pixel electrode 191 extends.

Next, the upper panel 200 is described.

A light blocking member 220 is formed on an insulation substrate 210 that may be made of transparent glass or plastic. The light blocking member 220 is referred to as a black matrix and prevents light leakage.

A plurality of color filters 230 are formed on the substrate 210 as the light blocking member 220. Most of the color filters 230 are disposed in a region surrounded by the light blocking member 220 and may extend in the longitudinal direction according to the column direction of the pixel electrodes 191. Each of the color filters 230 may represent a primary color such as red, green, and blue.

An overcoat 250 is formed on the color filter 230 and the light blocking member 220. The overcoat 250 may be made of an inorganic or organic insulator and prevents the color filters 230 from being exposed and provides a planarizing surface. The overcoat 250 may be omitted.

The liquid crystal layer 3 includes a nematic liquid crystal material having a positive dielectric anisotropy. Liquid crystal molecules of the liquid crystal layer 3 are arranged such that their long axes are parallel to the display panels 100 and 200, and they spirally twist by 90° from the rubbing direction of the alignment layer of the lower panel 100 to the upper display panel 200.

The pixel electrode 191 receives a data voltage from the drain electrode 175, and the reference electrode 271 receives a reference voltage from the reference voltage line 273.

The pixel electrode 191 to which a data voltage is applied and the reference electrode 271 to which the reference voltage is applied generate an electric field, and the liquid crystal molecules of the liquid crystal layer 3 positioned between the pixel electrodes 191 and the reference electrode 271 are rotated in a direction parallel to the direction of the electric field. The polarization of light that passes through the liquid crystal layer rotates depending on the orientation of the liquid crystal molecules as determined by the direction of the electric field vector of the electric field.

As described above, the liquid crystal molecules of the liquid crystal layer 3 are rotated by the electric field formed between the reference electrode 271 and the branch electrode of the pixel electrode 191. Here, in the liquid crystal display according to an exemplary embodiment of the present invention, the alignment layer is rubbed to establish a pretilt angle for the liquid crystal molecules of the liquid crystal layer 3. The rubbing angle is about 7° with respect to the branches of the pixel electrode 191 such that the liquid crystal molecules may be quickly rotated in the pretilt direction.

The reference electrode 271 covers and electrically connects to a portion of the reference voltage line 273, thereby the aperture ratio may be increased and the manufacturing process may be simplified compared with conventional liquid crystal displays that connect similar items that are spatially separated through a contact hole.

Figure 3:
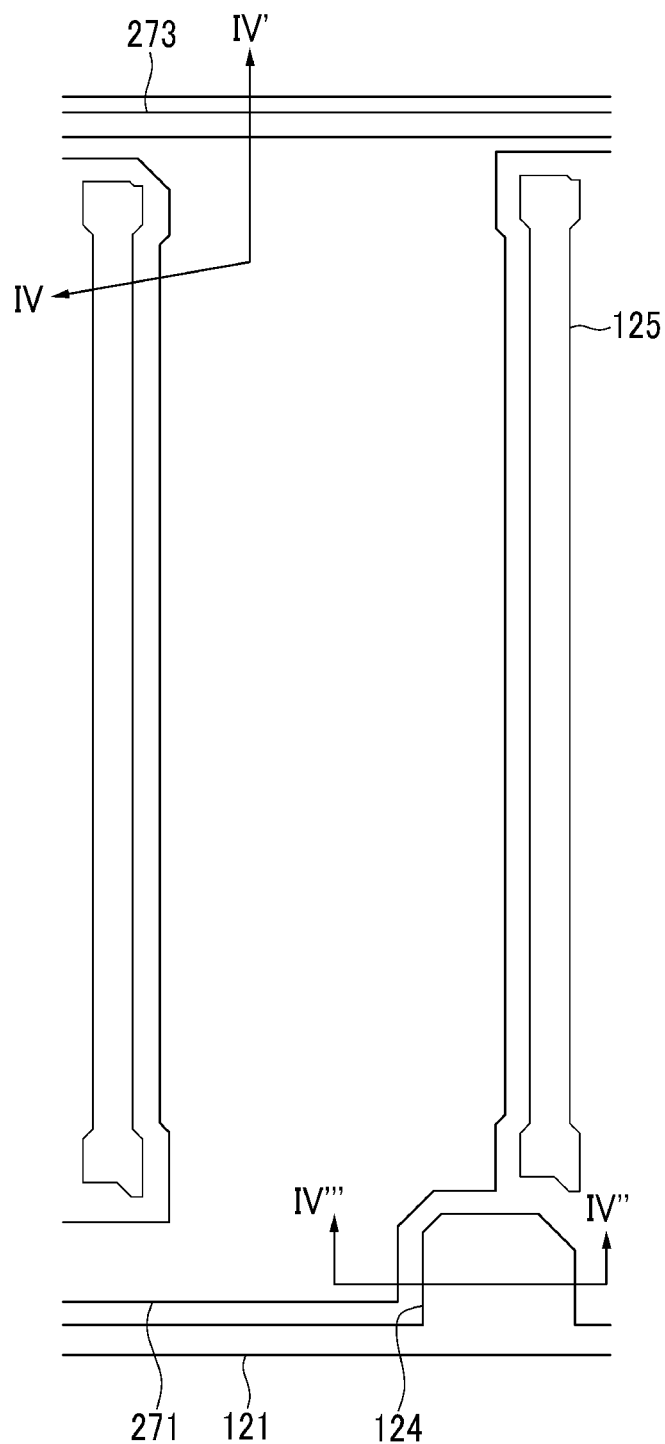
FIG. 3, FIG. 6, and FIG. 8 are layout views showing parts according to a manufacturing method of a liquid crystal display according to an exemplary embodiment of the present invention.

Next, a manufacturing method of a liquid crystal display according to an exemplary embodiment of the present invention will be described with reference to FIG. 3, FIG. 4, FIG. 5A, FIG. 5B, FIG. 5C, FIG. 5D, FIG. 5E, FIG. 6, FIG. 7, FIG. 8, and FIG. 9. FIG. 3, FIG. 6, and FIG. 8 are layout views showing parts according to a manufacturing method of a liquid crystal display according to an exemplary embodiment of the present invention. FIG. 4, FIG. 5A, FIG. 5B, FIG. 5C, FIG. 5D, FIG. 5E, FIG. 7, and FIG. 9 are cross-sectional views showing parts according to a manufacturing method of a liquid crystal display according to an exemplary embodiment of the present invention.

Figure 4:
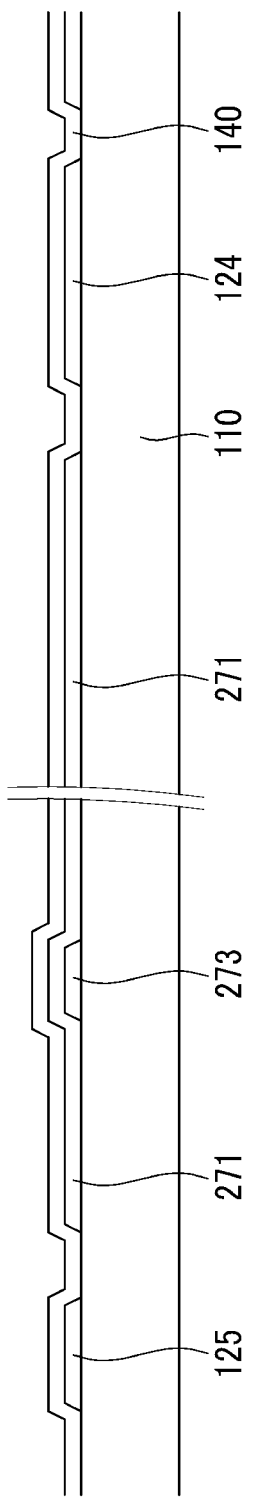

First, referring to FIG. 3 and FIG. 4, a gate conductor (121, 124, 125, and 273) including a gate line 121 having a gate electrode 124, a dummy line 125, a reference voltage line 273, and a reference electrode 271 covering a portion of the reference voltage line 273 to be directly connected thereto are formed on an insulation substrate 110.

A method of forming the gate conductor (121, 124, 125, and 273), and the reference voltage line 273 will be described with reference to FIG. 5A, FIG. 5B, FIG. 5C, FIG. 5D, and FIG. 5E.

Referring to FIG. 5A, a first metal layer 120 is deposited on the insulation substrate 110, and a photosensitive film 400 is formed thereon. Next, the photosensitive film 400 is exposed and developed by using an exposure mask 500 having at least three regions: region A blocks light; region B completely transmits light; and region C partially transmits light.

Figure 5B:
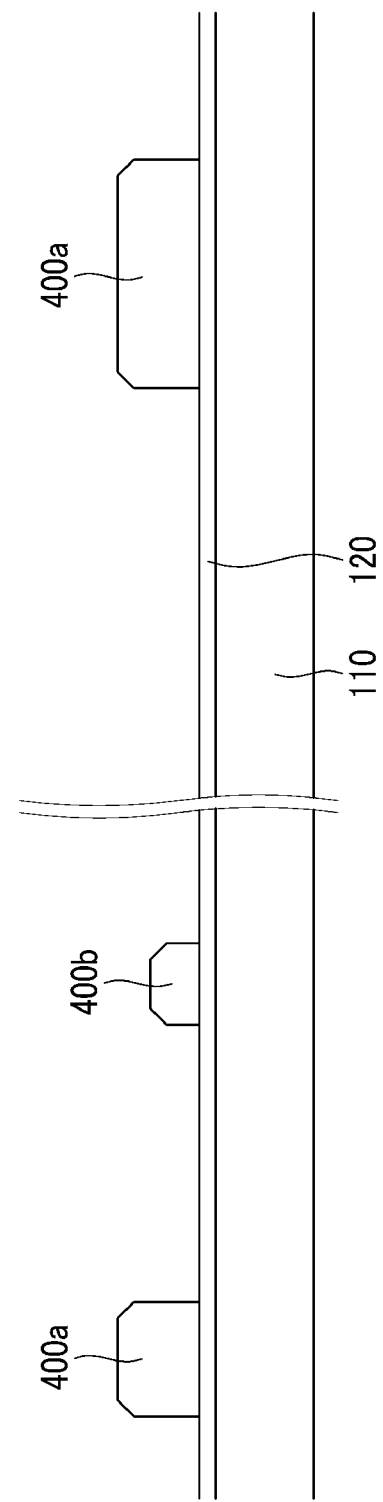
Figure 6:
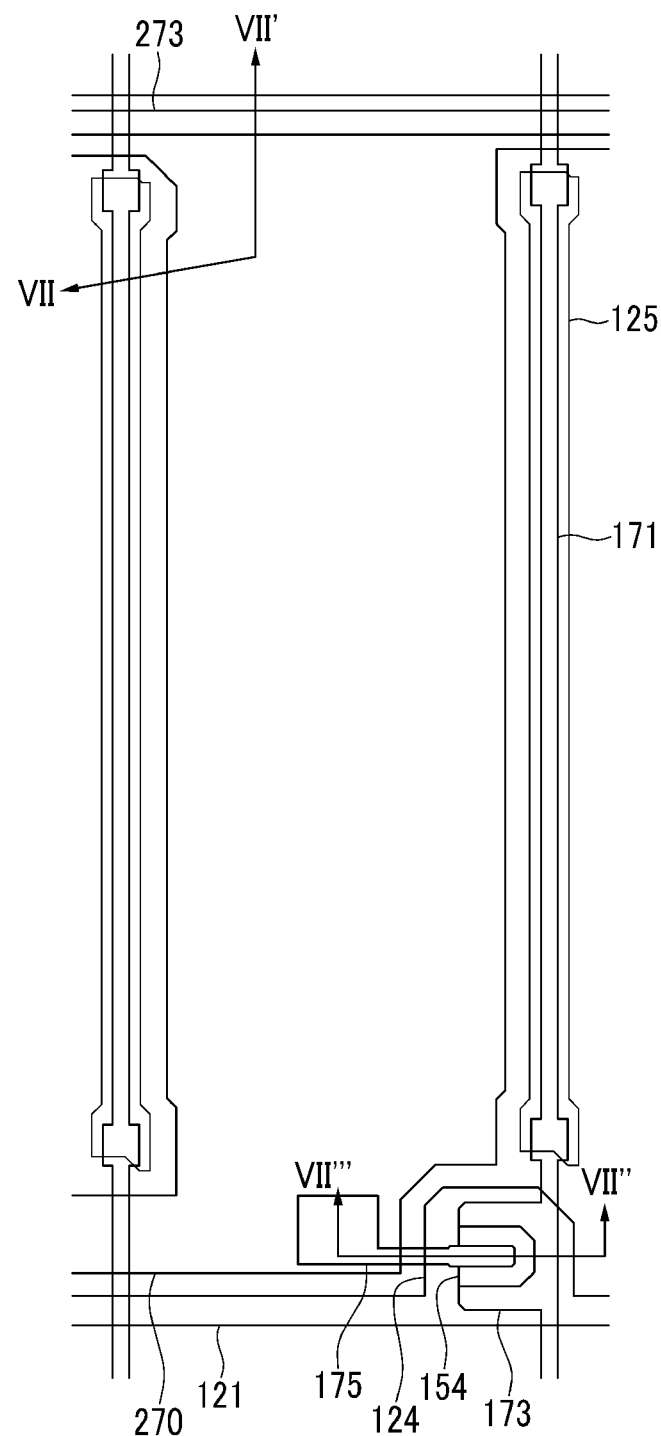

By exposing and developing the photosensitive film 400 to produce the structure shown in FIG. 5B, a photosensitive film pattern 400a and 400b having different thicknesses is formed. In detail, the first photosensitive film pattern 400a is thickest; the second photosensitive film pattern 400b has a thinner thickness than the first photosensitive film pattern 400a, and the other portions of the photosensitive film pattern 400 corresponding to region B of the exposure mask are removed. The first photosensitive film pattern 400a is formed at a position corresponding to the gate line 121 and the dummy line 125 among the gate conductor (121, 125, and 273), and the second photosensitive film pattern 400b is formed at a position corresponding to the reference voltage line 273.

The thicknesses of the first photosensitive film pattern 400a and the second photosensitive film pattern 400b may be different according to process conditions of an etching process that will be described later, and the thickness of the second photosensitive film pattern 400b is preferably less than half the thickness of the first photosensitive film pattern 400a. Various methods may be used for forming the photosensitive patterns 400a and 400b such that portions thereof may have different thicknesses according to their positions. Included in the methods is one that, for example, uses an exposure mask that includes a transparent area, a light blocking area, and a semi-transparent area. The semi-transparent area may include a slit pattern, a lattice pattern, or a thin film having partial transmittance or having a medium thickness. When the slit pattern is used, preferably, the width of the slits or the space between the slits is smaller than resolution of light from a light exposer used for photolithography. Another example of the method includes using a reflowable photosensitive film. That is, the method forms a thin portion by flowing a photosensitive film into a region where the photosensitive film is not present after forming the reflowable photosensitive film using a general exposure mask having two areas, a light transmitting area and a light blocking area.

After forming the photosensitive film pattern 400a and 400b having different thicknesses depending on the positions, as shown in FIG. 5C, the first metal layer 120 is etched using the photosensitive film pattern 400a and 400b as a mask to form the gate line 121, the gate electrode 124, the dummy line 125, and the reference voltage line 273. Here, the first metal layer 120 may be over-etched to produce an undercut.

Figure 5D:
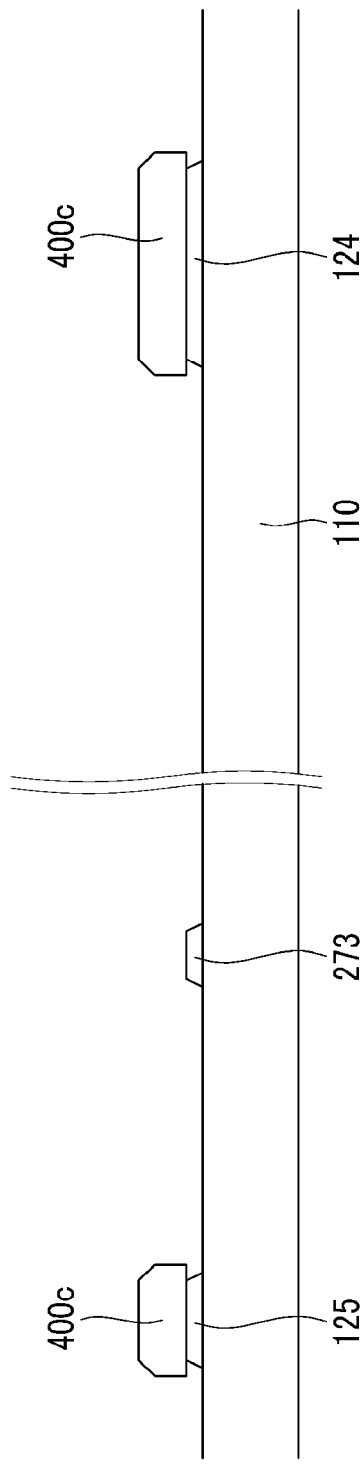

Next, as shown in FIG. 5D, the second photosensitive film pattern 400b is removed through an etchback process to expose the reference voltage line 273. Here, the thickness of the first photosensitive film pattern 400a is reduced such that a third photosensitive film pattern 400c is formed. It is preferable that the thickness of the third photosensitive film pattern 400c introduces a sufficient step from the surface of the substrate 110.

As described above, after the reference voltage line 273 is exposed, and the gate line 121, the gate electrode 124, and the dummy line 125 are covered by the third photosensitive film pattern 400c, a second metal layer 270 is deposited on the whole surface of the substrate 110. Here, the second metal layer 270 deposited on the third photosensitive film pattern 400c and the metal layer 270 deposited on the remaining region are separated by the third photosensitive film pattern 400c and the surface of the substrate 110. Since the reference voltage line 273 is exposed, the second metal layer 270 is formed directly on and covers the reference voltage line 273.

Figure 5E:
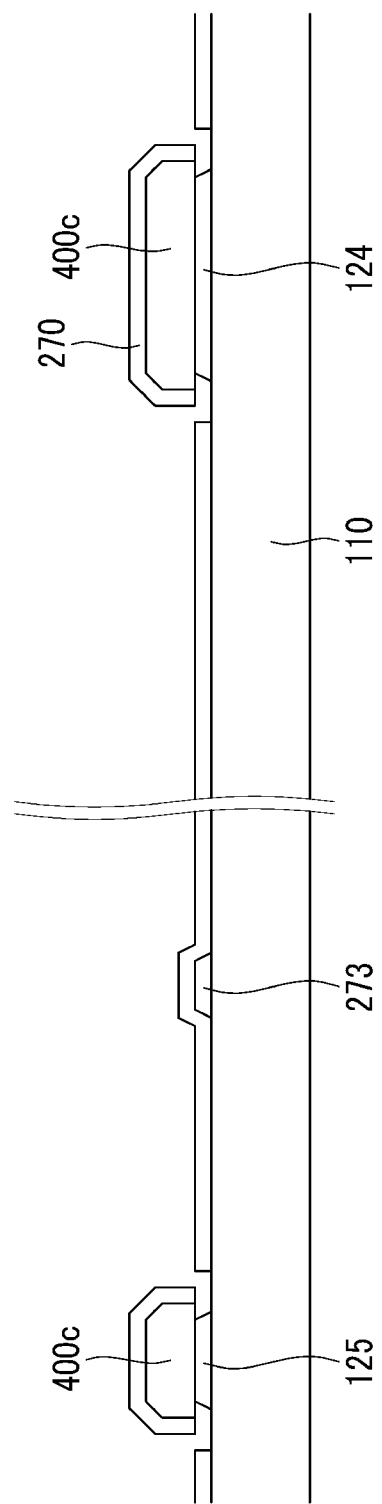

Next, as shown in FIG. 5E, the third photosensitive film pattern 400c and the second metal layer 270 deposited thereon are removed together such that the reference electrode 271 (which is separated from the gate line 121, the gate electrode, and the dummy line 125 and covering the reference voltage line 273 connected thereto) is completed.

As described above, in the manufacturing method of the liquid crystal display according to the present exemplary embodiment, the reference electrode is formed along the gate conductor through one photolithography process such that the number of masks is limited to a small number. Consequently, the manufacturing process may be simplified, and the manufacturing cost may be decreased.

Figure 7:
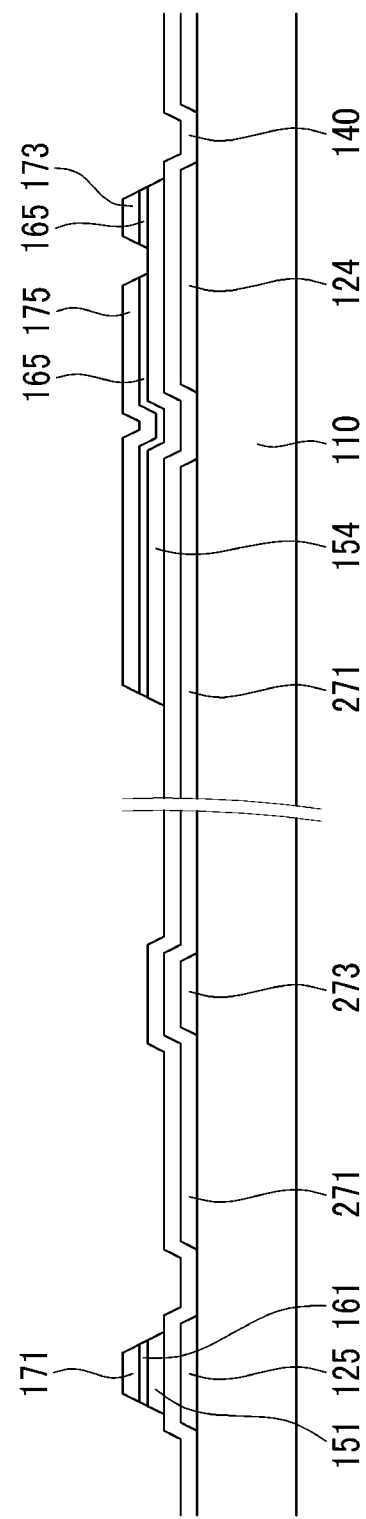
Figure 8:
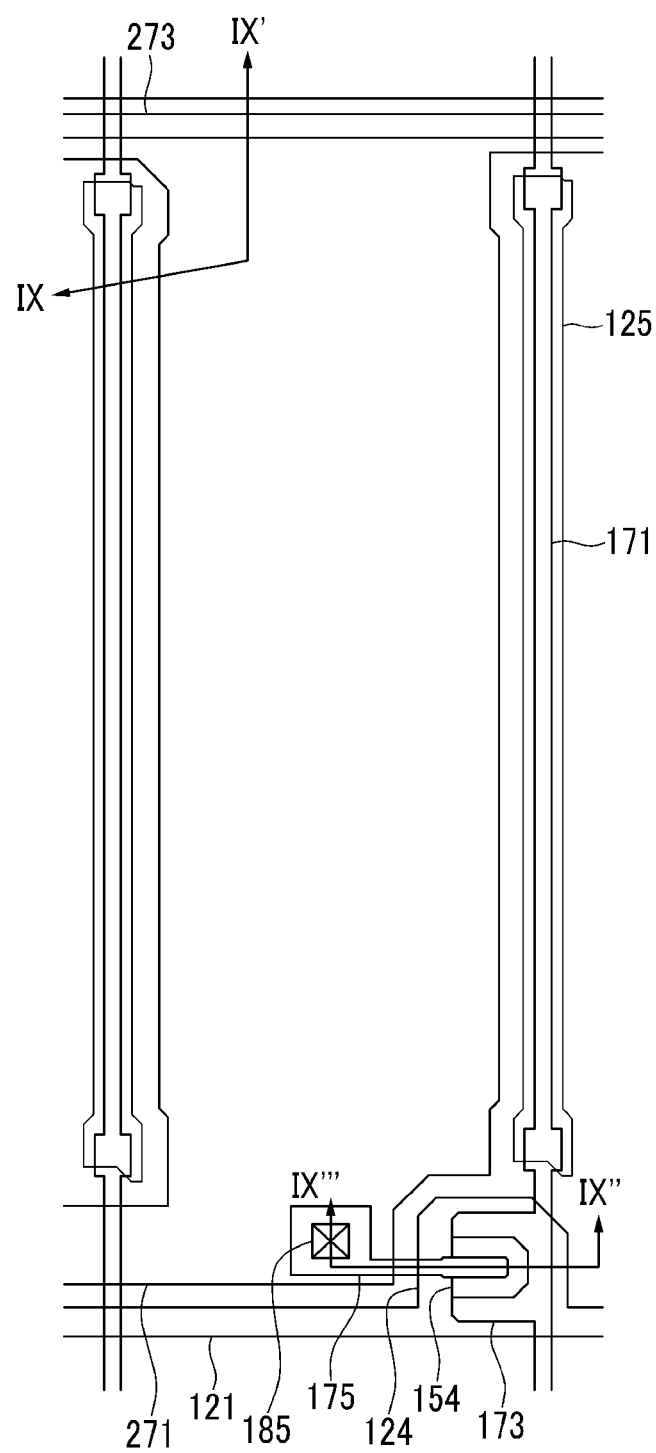

Next, as shown in FIG. 6 and FIG. 7, a gate insulating layer 140 is deposited on the gate conductor (121, 124, 125, and 273) and the reference electrode 271. A semiconductor (151 and 154), ohmic contact layers (161, 163, and 165), a data line 171, a source electrode 173, and a drain electrode 175 are also formed.

In detail, after the gate insulating layer 140, which may be made of silicon nitride (SiNx), is deposited on the gate conductor (121, 124, 125, and 273) and the reference electrode 271, intrinsic amorphous silicon (a-Si) in which an impurity is not doped and amorphous silicon (n+a-Si) that is doped with an impurity may be deposited through, e.g., plasma enhanced chemical vapor deposition (PECVD). Then, a third metal layer is deposited. Next, after forming a photosensitive film on the third metal layer, the photosensitive film is exposed and developed to form a photosensitive film pattern having different thicknesses. Using the photosensitive film pattern as a mask, the third metal layer may be wet-etched, and the doped amorphous silicon layer and the intrinsic amorphous silicon layer may be dry-etched. Next, the photosensitive film pattern corresponding to the channel is removed, and the third metal layer and the doped amorphous silicon layer may be etched by using the remaining photosensitive film pattern as a mask to expose the semiconductor 154 between the source electrode 173 and the drain electrode 175.

Figure 9:
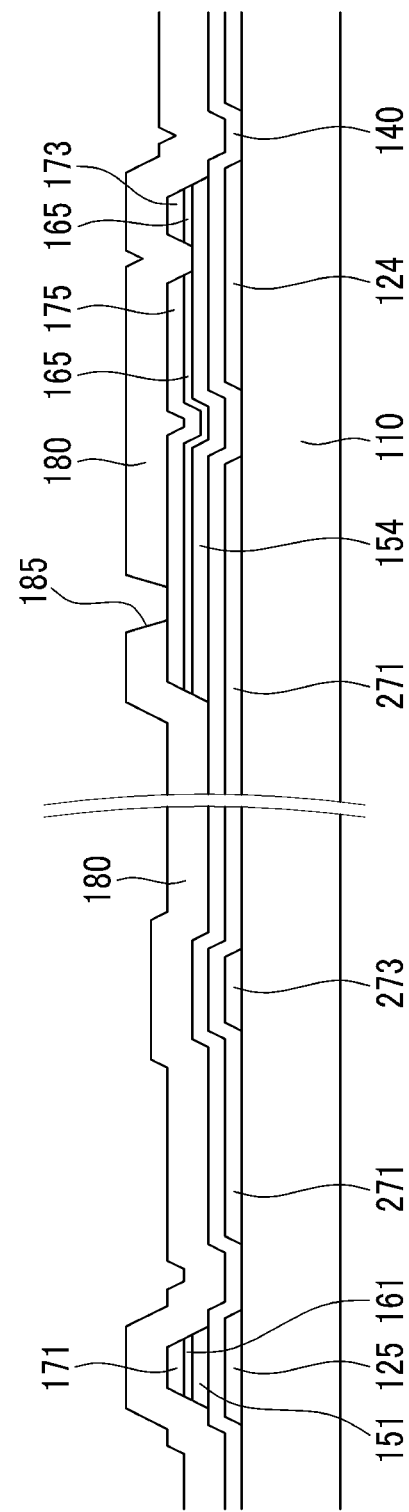

Next, as shown in FIG. 8 and FIG. 9, a passivation layer 180 covering the data line 171, the drain electrode 175, the source electrode 173, the exposed semiconductor 154, and the gate insulating layer 140 is deposited and patterned by a photolithography process to form a plurality of contact holes 185.

Finally, as shown in FIG. 1 and FIG. 2, a transparent conductive material such as ITO or IZO is deposited by sputtering and is patterned on the passivation layer 180 to form a pixel electrode 191.

As described above, in the manufacturing method of the liquid crystal display according to the present exemplary embodiment, the reference electrode is formed along the gate conductor through one photolithography process such that the number of masks is not increased. Consequently, the manufacturing process may be simplified, and the manufacturing cost may be decreased.

Also, the reference electrode is directly formed on the reference voltage line connected thereto without an additional contact hole such that the aperture ratio of the liquid crystal display is increased.

In the above exemplary embodiments, the reference electrode has a sheet shape without an additional pattern in the pixel area, and the pixel electrode includes the plurality of linear branch electrodes and the branch electrode connection connecting them. However, the present invention is not limited thereto. That is, the pixel electrode may have a sheet shape without an additional pattern in the pixel area, and the reference electrode may include a plurality of linear branch electrodes and a branch electrode connection connecting them. Also, as well as the case in which the color filter and the light blocking film are formed on the upper substrate, the present invention may be applied to cases in which the color filter and the blocking film are formed on the insulation substrate.

While this invention has been described in connection with exemplary embodiments, it will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A liquid crystal display, comprising:
a first substrate;
a gate line, a gate electrode, and a reference voltage line each disposed on the first substrate;
a reference electrode disposed on the first substrate and disposed in a whole pixel area;
a gate insulating layer disposed on the gate line, the gate electrode, and the reference electrode;
a semiconductor disposed on the gate insulating layer and the gate electrode;
a data line and a drain electrode disposed on the semiconductor;
a passivation layer disposed on the data line and the drain electrode; and
a pixel electrode connected to the drain electrode and overlapping the reference electrode in the pixel area,
wherein the reference electrode is disposed directly on the reference voltage line, and the reference voltage line is disposed between the first substrate and the reference electrode.

2. The liquid crystal display of claim 1, further comprising a dummy line disposed under the semiconductor and the data line.

3. The liquid crystal display of claim 2, wherein the dummy line is arranged in the same layer as the gate line.

4. The liquid crystal display of claim 3, wherein the dummy line is configured to electrically float.

5. The liquid crystal display of claim 4, wherein the gate line and the reference voltage line are arranged in the same layer.

6. The liquid crystal display of claim 5, wherein the pixel electrode is connected to the drain electrode through a contact hole in the passivation layer.

7. The liquid crystal display of claim 6, wherein the reference electrode covers the reference voltage line.

8. The liquid crystal display of claim 7, further comprising:
a second substrate facing the first substrate; and
a liquid crystal layer arranged between the first substrate and the second substrate and comprising liquid crystal molecules having a positive dielectric anisotropy.

9. The liquid crystal display of claim 2, wherein the dummy line is configured to electrically float.

10. The liquid crystal display of claim 1, wherein the gate line and the reference voltage line are arranged in the same layer.

11. The liquid crystal display of claim 1, wherein the pixel electrode is connected to the drain electrode through a contact hole in the passivation layer.

12. The liquid crystal display of claim 1, wherein the pixel electrode comprises a plurality of branch electrodes.

13. The liquid crystal display of claim 1, further comprising:
a second substrate facing the first substrate; and
a liquid crystal layer arranged between the first substrate and the second substrate and comprising liquid crystal molecules having a positive dielectric anisotropy.

14. A method for manufacturing a liquid crystal display, the method comprising:
forming a gate line, a gate electrode, a reference voltage line, and a reference electrode on a substrate using one photolithography step;
forming a gate insulating layer on the substrate, the gate line, the gate electrode, the reference voltage line, and the reference electrode;
forming a semiconductor, a data line, and a drain electrode on the gate insulating layer;
forming a passivation layer on the semiconductor, the data line, and the drain electrode; and
forming a pixel electrode on the passivation layer,
wherein the reference electrode is disposed directly on the reference voltage line, and the reference voltage line is disposed between the substrate and the reference electrode.

15. The method of claim 14, wherein forming the gate line, the gate electrode, the reference voltage line, and the reference electrode comprises:
forming a first metal layer on the substrate;
forming a photosensitive film on the first metal layer;
processing the photosensitive film to form a first photosensitive film pattern and a second photosensitive film pattern having different thicknesses;
etching the first metal layer using the first photosensitive film pattern and the second photosensitive film pattern as a mask;
removing the second photosensitive film pattern;
reducing the thickness of the first photosensitive film pattern to form a third photosensitive film pattern;
depositing a second metal layer on the substrate, the first metal layer, and the third photosensitive film pattern; and
removing the third photosensitive film pattern.

16. The method of claim 15, wherein etching the first metal layer comprises forming an undercut in the first metal layer.

17. The method of claim 16, wherein removing the second photosensitive film pattern exposes the reference voltage line.

18. The method of claim 17, wherein the first metal layer forms the gate line, and the second metal layer forms the reference electrode.

19. The method of claim 18, wherein the gate line and the reference voltage line are formed in the same layer.

20. The method of claim 19, wherein forming the gate line, the gate electrode, the reference voltage line, and the reference electrode further comprises forming a dummy line disposed under the semiconductor and the data line.

21. The method of claim 20, wherein the dummy line is simultaneously formed with the same layer as the gate line.

22. The method of claim 21, wherein the dummy line is configured to electrically float.

23. The method of claim 22, further comprising forming a contact hole in the passivation layer, wherein the pixel electrode is connected to the drain electrode through the contact hole.

24. The method of claim 23, wherein the pixel electrode comprises a plurality of branch electrodes.

25. The method of claim 14, wherein the gate line is arranged in the same layer as the reference voltage line.

26. The method of claim 14, wherein forming the gate line, the gate electrode, the reference voltage line, and the reference electrode further comprises forming a dummy line under the semiconductor and the data line.

27. The method of claim 26, wherein the dummy line is simultaneously formed with the same layer as the gate line.

28. The method of claim 27, wherein the dummy line is configured to electrically float.

29. The method of claim 14, further comprises forming a contact hole in the passivation layer, wherein the pixel electrode is connected to the drain electrode through the contact hole.

30. The method of claim 14, wherein the pixel electrode comprises a plurality of branch electrodes.

31. A liquid crystal display, comprising:
a first panel comprising a substrate;
a second panel facing the first panel;
a liquid crystal layer disposed between the first panel and the second panel and comprising liquid crystal molecules;
a gate electrode and a reference voltage line both disposed on the substrate;
a reference electrode disposed on the substrate and connected to the reference voltage line;
a drain electrode connected to the drain electrode and overlapping the reference electrode; and
a pixel electrode connected to the drain electrode and overlapping the reference electrode,
wherein the reference electrode is configured to receive a first voltage from the reference voltage line, the pixel electrode is configured to receive a second voltage, and the liquid crystal molecules are oriented based on the difference between the first voltage and the second voltage, and
wherein the reference electrode is disposed directly on the reference voltage line, and the reference voltage line is disposed between the substrate and the reference electrode.

32. The liquid crystal display of claim 31, wherein the gate line is arranged in the same layer as the reference voltage line.

33. The liquid crystal display of claim 32, wherein the pixel electrode is connected to the drain electrode through a contact hole arranged in a passivation layer disposed on the drain electrode.

34. The liquid crystal display of claim 33, wherein the pixel electrode comprises a plurality of branch electrodes.

35. The liquid crystal display of claim 34, wherein the liquid crystal molecules have a positive dielectric anisotropy.

36. The liquid crystal display of claim 31, wherein the pixel electrode comprises a plurality of branch electrodes.

* * * * *